United States Patent Office 3,232,835
Patented Feb. 1, 1966

3,232,835
2-CHLORO PREDNISONES AND THE 9α-FLUORO DERIVATIVES THEREOF
Sanford K. Figdor, Forest Hills, and Gerald D. Laubach, Jackson Heights, N.Y., assignors to Chas. Pfizer & Co., Inc., New York, N.Y., a corporation of Delaware
No Drawing. Filed Dec. 4, 1957, Ser. No. 700,548
5 Claims. (Cl. 167—65)

This invention is concerned with new and useful halogenated $\Delta^4$-3-ketosteroids as well as with a novel process for their production. In particular, it relates to 2-halo-$\Delta^{1,4}$- and $\Delta^{1,4,6}$-3-keto-11-oxysteroids and to 6-halo-$\Delta^{4,6}$- and $\Delta^{1,4,6}$-3-keto-11-oxysteroids of the pregnadiene and pregnatriene series wherein the halogen atom is selected from the group consisting of chlorine and bromine. These compounds are of therapeutic value in view of their antiinflammatory properties and so are especially useful for the treatment of rheumatoid arthritis.

In accordance with the prior art, the chlorination of $\Delta^4$-3-ketosteroids in diethyl ether-acetic acid was known to proceed via an allylic mechanism. Thus, it would generally be expected that chlorination of corticosteroids would result in ring substitution rather than in addition at the double bond. A primary object of the present invention is to provide a novel method for the conversion of $\Delta^{1,4}$-, $\Delta^{4,6}$- and $\Delta^{1,4,6}$-3-ketosteroids into 2-halo-$\Delta^{1,4}$-3-ketosteroids, 6-halo-$\Delta^{4,6}$-3-ketosteroids and 2-halo-$\Delta^{1,4,6}$-3-ketosteroids, respectively, wherein the halogen atom is chosen from the group consisting of chlorine and bromine as aforesaid. A further object of this invention is to provide a series of new and useful halogenated $\Delta^4$-3-keto-11-oxysteroids of the pregnadiene and pregnatriene series which were heretofore unavailable by any known synthetic route. A still further object of this invention is to provide pharmaceutical compositions useful for the treatment of rheumatoid arthritis which comprise the aforementioned compounds together with pharmaceutically acceptable carriers.

In accordance with this invention, there is now made available for the first time a series of compounds selected from the class consisting of 2-halo-$\Delta^{1,4}$-11-oxycorticosteroids, 2-halo-$\Delta^{1,4,6}$-11-oxycorticosteroids, 6-halo-$\Delta^{4,6}$-11-oxycorticosteroids and 6-halo-$\Delta^{1,4,6}$-11-oxycorticosteroids, the halogen being defined as above. Where reference is made to a corticosteroid in this application, the term refers to a $\Delta^4$-3-ketosteroid having 21 carbon atoms in the carbon skeleton of the steroid molecule and possessing hydroxyl groups at the 17α- and 21-positions of the molecule. Specific examples of such products include 2-chloroprednisone, 2-chloro-9α-fluoroprednisone, 2-chloroprednisolone, 2-chloro-9α-fluoroprednisolone, 6-chloro-$\Delta^{4,6}$-pregnadiene-17α,21-diol-3,11,20-trione, 6-chloro-9α-fluoro - $\Delta^{4,6}$ - pregnadiene - 11β,17α-diol-3,11,20-trione, 6-chloro - $\Delta^{4,6}$ - pregnadiene-11β,17α,21-triol-3,20-dione, 6-chloro - 9α-fluoro-$\Delta^{4,6}$-pregnadiene-11β,17α,21-triol-3,20-dione, 2-chloro-$\Delta^{1,4,6}$-pregnatriene-17α,21-diol-3,11,20-trione, 2-chloro-9α-fluoro-$\Delta^{1,4,6}$-pregnatriene - 17α,21 - diol-3,11,20-trione, their 14α- and 16α-hydroxyl derivatives, and the bromo analogues of all these compounds, as well as their 21-hydrocarbon carboxylic acid esters wherein the ester grouping has from two to eight carbon atoms in the acyl moiety.

The process of this invention comprises contacting a compound selected from the group consisting of prednisone, $\Delta^6$-dehydroprednisone, the 11-trifluoroacetyl derivatives of prednisolone and $\Delta^6$-dehydroprednisolone, $\Delta^{1,4}$-pregnadiene-17α,21-diol-3,20-dione, $\Delta^{4,6}$-pregnadiene-17α,21-diol-3,20-dione, $\Delta^{4,6}$-pregnadiene-17α,21-diol-3,11,20-trione, $\Delta^{1,4,6}$-pregnatriene-17α,21-diol-3,20-dione, $\Delta^{1,4,6}$-pregnatriene-17α,21-diol-3,11,20-trione, their 9α-fluoro, 14α-hydroxyl and 16α-acetoxy derivatives, and the 21-hydrocarbon carboxylic acid esters of all these compounds wherein the ester grouping is defined as above, in an inert polar organic solvent with a halogenating agent chosen from the group consisting of chlorine and bromine in the presence of a lower aliphatic hydrocarbon carboxylic acid having at least two carbon atoms. In the case of a $\Delta^{1,4}$-corticosteroid, halogen addition takes place at the 1,2-positions; in the case of a $\Delta^{4,6}$-corticosteroid, halogen addition takes place at the 6,7-positions; and in the case of a $\Delta^{1,4,6}$-corticosteroid, halogen addition preferentially occurs at the 1,2-positions. The resulting dihalo addition compound is then treated with a tertiary amine whereby dehydrohalogenation is effected. In this manner, the desired compounds of this invention are obtainable in good yield and under mild conditions.

In accordance with the process of this invention, any inert polar organic solvent is a suitable medium for this reaction, although it is most desirable to employ tetrahydrofuran, dioxane, lower alkyl ethers, and lower alkyl nitriles. Preferred lower alkyl ethers include diethyl ether, di-n-propyl ether, di-n-butyl ether, and the like; and preferred lower alkyl nitriles include acetonitrile, propionitrile, and the like. The tertiary amine employed for the dehydrohalogenation step may be either a lower aliphatic tertiary amine, a N,N-di-lower alkyl derivative of aniline or a heterocyclic nitrogen compound. Preferred tertiary amines include triethylamine, N,N-dimethylaniline, N,N-diethylaniline, pyridine, quinoline, collidine, lutidine and picoline, and the like.

The mechanism by which this process proceeds is not completely understood. It would be anticipated that halogen would not selectively add to the double bonds at the 1,2-positions and/or 6,7-positions, but that it would be introduced by means of addition at the 4,5-positions or by allylic substitution on the ring nucleus. Nevertheless, it has been unexpectedly discovered that the aforementioned halogenated corticosteroids are produced in good yield by the process of this invention as is illustrated by the following equation for the conversion of a $\Delta^{1,4}$-corticosteroid to a 2-halo-$\Delta^{1,4}$-corticosteroid:

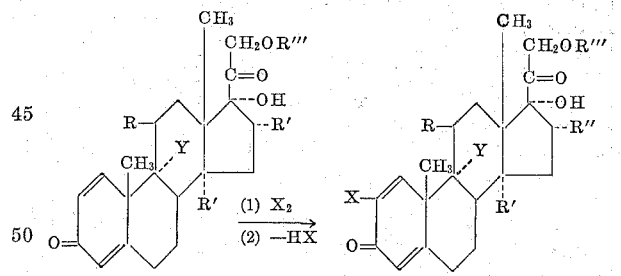

In this example, R may either be a hydrogen atom, an oxo group or a β-trifluoroacetyl group, X is a halogen atom selected from the group consisting of chlorine and bromine, Y is either a hydrogen or a fluorine atom, R' and R'' are either hydrogen atoms or hydroxyl groups, and R''' is either a hydrogen atom or an acyl group having from two to eight carbon atoms. For example, this reaction is applicable to such $\Delta^{1,4}$-3-ketosteroids as prednisone, prednisolone, 9α-fluoroprednisone, 9α-fluoroprednisolone, $\Delta^{1,4}$-pregnadiene-17α,21 - diol - 3,20 - dione, and the like and their 14α- and 16α-hydroxy derivatives, as well as to the 21-hydrocarbon carboxylic acid esters of all these compounds, such as the 21-acetate, propionate, butyrate, valerate, caproate, benzoate, phenylacetate, thenoate, and the like, provided that the 11β-hydroxyl groups are first protected by means of trifluoroacetyl groups and the 16α-hydroxyl groups are blocked by means of acetyl groups.

The blocking of the 11β-hydroxyl group referred to above and in other parts of this application is necessary in order to prevent its oxidation to the keto group. This is accomplished by the use of trifluoroacetyl chloride as described in U.S. Patent 2,800,489 or by means of trifluoroacetic anhydride according to the procedure described by A. L. Henne et al. in the Helv. Chem. Acta., vol. 37, pages 388 and 443 (1954). After completion of the halogenation step, the trifluoroacetyl groups are then removed by means of hydrolysis with such agents as dry methanol, or aqueous alkali or alkaline earth bicarbonates. Furthermore, the corresponding 2-halo-$\Delta^{1,4,6}$-corticosteroids are easily obtained by subjecting the above 2-halo-$\Delta^{1,4}$-corticosteroids to the chloranil-dehydrogenation procedure dscribed by E. J. Agnello et al., in the Journal of the American Chemical Society, vol. 79, page 1258 (1957).

The process of this invention may also be illustrated by an equation for the conversion of a $\Delta^{4,6}$-corticosteroid to a 6-halo-$\Delta^{4,6}$-corticosteroid:

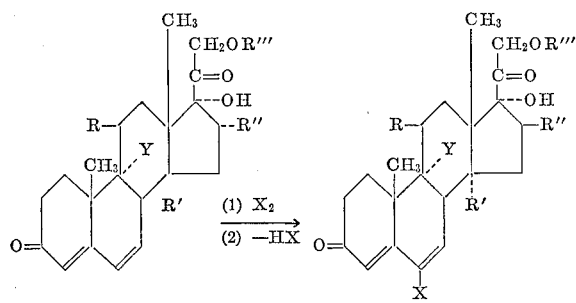

The above groups have the same meaning as previously defined for the first equation. Furthermore, a $\Delta^{1,4,6}$-corticosteroid is converted to a 2-halo-$\Delta^{1,4,6}$-corticosteroid by the use of this process. The isomeric 6-halo-$\Delta^{1,4,6}$-corticosteroids are prepared by subjecting the above 6-halo-$\Delta^{4,6}$-corticosteroids to the aforementioned chloranil-dehydrogenation procedure or to a selenium dioxide dehydrogenation according to standard procedures previously described in the prior art. Examples of suitable starting materials include $\Delta^{4,6}$-pregnadiene-17$\alpha$,21-diol-3,20-dione, $\Delta^{4,6}$-pregnadiene-17$\alpha$,21-diol-3,11,20-trione, $\Delta^{4,6}$-pregnadiene-11$\beta$,17$\alpha$,21-triol-3,20-dione, $\Delta^{1,4,6}$-pregnatriene-17$\alpha$,21-diol-3,20-dione, $\Delta^{1,4,6}$-pregnatriene-17$\alpha$,21-diol-3,11,20-trione, $\Delta^{1,4,6}$-pregnatriene-11$\beta$,17$\alpha$,21-triol-3,20-dione, their 9$\alpha$-fluoro analogues, and their 14$\alpha$- and 16$\alpha$-hydroxyl derivatives, as well as 21-hydrocarbon carboxylic acid esters of all these compounds wherein the acyl moiety of the ester grouping has from two to eight carbon atoms as previously defined, provided that the 11$\beta$-hydroxyl and 16$\alpha$-hydroxyl groups are first acylated as aforesaid.

The halogenated 11-oxycorticosteroids of this invention may be administered for therapeutic purposes either alone or in combination with a pharmaceutically acceptable carrier by both the oral and parenteral routes as well as topically. For example, they may be administered in the form of troches, lozenges, capsules and tablets, or as constituents of aqueous suspensions, elixirs and other pharmaceutical preparations, such as salves and ointments. The usual dosage for administering these compositions to humans is in the range of approximately 10–500 mg. per day, although this will vary somewhat with the weight of the person being treated; in general, about 1.0 mg. to about 10 mg. per kg. of body weight per day is usually employed. For purposes of oral administration, gelatin capsules containing these halogenated 11-oxycorticosteroids together with an inert filler, such as lactose or milk sugar are prepared, although tablets containing these compounds as the essential active ingredient together with excipients, such as starch and sugar, are also employed; similarly, elixirs or aqueous suspensions of these compounds having a sweetening or flavoring agent present are also applicable. For purposes of parenteral administration, the halogenated corticosteroids of this invention are preferably administered via an injectable aqueous sterile solution which has been rendered isotonic by the addition of sufficient saline or glucose. In addition, these compounds may also be administered topically in the form of ointments, creams, salves, and other similar pharmaceutical preparations.

In accordance with a specific embodiment of the process of this invention, a $\Delta^{1,4}$- or $\Delta^{4,6}$-3-ketosteroid of the pregnadiene series or a $\Delta^{1,4,6}$-3-ketosteroid of the pregnatriene series is dissolved in one of the aforesaid inert polar organic solvents and the resulting solution is then contacted with the desired halogenating agent which is dissolved in a lower aliphatic hydrocarbon carboxylic acid having at least two carbon atoms such as acetic acid, propionic acid, butyric acid, and the like. In general, the amount of halogenating agent employed is in the range of from about 1.0 to about 1.25 mole per mole of starting material, the slight excess being preferably employed when there is no double bond at the 1,2-positions. The temperature at which this process is carried out is in the range of from about $-50°$ C. to about 30° C., the preferred range being from about $-30°$ C. to about 10° C. After the completion of the aforesaid addition, the reaction mixture is generally allowed to stand at room temperature for about 8 to about 24 hours. At the end of this time period, the di-halo addition compound may be recovered from the reaction mixture by first dissolving the latter compound in water and then extracting the resulting aqueous solution with two portions of a water-immiscible organic solvent, such as a lower alkyl ether, each portion being equal in volume to the amount of water added. The organic extracts are then combined and dried over a suitable drying agent, such as anhydrous sodium sulfate, anhydrous magnesium sulfate or anhydrous calcium sulfate. After removal of the drying agent by means of filtration, the desired product is isolated by concentrating the filtrate, preferably under reduced pressure, until crystallization occurs. Further purification of the product so obtained is then carried out by means of recrystallization from a suitable organic solvent system, e.g., acetone-diethyl ether (1:1).

The reaction of the dihalo-$\Delta^4$-3-ketosteroid intermediate with one of the aforesaid tertiary amines results in the formation of the desired compounds. The chemical structure of these new halogenated corticosteroids is readily confirmed by comparing their ultra-violet absorption spectra with that of the non-halogenated steroid starting materials; in each case, a bathochromic shift of the absorption maximum has been observed to occur. In general, the dehydro-halogenation reaction is carried out at a temperature in the range of from about 20° C. to about 100° C. for a time period of from about 0.5 to about 4.0 hours; however, for the sake of convenience and economy, it is preferably carried out at room temperature, although it may be found desirable to gently heat the reaction mixture initially in order to effect complete dissolution. In general, an excess in moles of the tertiary amine is employed in order to facilitate completion of the reaction; furthermore, the excess reagent serves as a suitable solvent medium for the reaction. The desired compound is then removed from the reaction mixture by means of extraction with a water-immiscible organic solvent and preferably a chlorinated lower hydrocarbon solvent, such as methylene chloride, chloroform, ethylene dichloride, trichloroethylene, tetrachloroethane, and the like. After washing the combined halogenated hydrocarbon extracts with dilute aqueous acid in order to remove any excess organic amine and then washing with water, the pooled solvent extracts are dried over one of the aforementioned drying agents, filtered and the resulting filtrate concentrated, preferably by means of evaporation under reduced pressure. The crude material which crystallizes is then isolated by means of filtration and further purified by means of recrystallization from a suitable organic solvent system, as aforesaid.

The aforementioned Δ⁴-3-ketosteroids employed as starting materials in the process of this invention are either known compounds or are easily prepared according to procedures described in the chemical literature and hence, they are well-known to those skilled in the art. For example, it has been reported that certain fungi can carry out the dehydrogenation of steroids at the 1,2-positions, a conversion that is of importance in the production of prednisone and prednisolone. In particular, G. Shull has described in U.S. Patent 2,776,927 issued on January 8, 1957, a procedure for the production of prednisone from cortisone by means of microorganisms of the genus Protaminobacter. Furthermore, the 9α-fluoro derivatives may be prepared by dehydrating the corresponding 11β-hydroxysteroids with p-toluenesulfonic acid, followed by the formation of an epoxide ring across the double bond at the 9,11-positions by means of hypochlorous acid addition and subsequent elimination of hydrochloric acid, and then treating the resulting epoxy compounds with hydrofluoric acid to form the desired 9α-fluoro-11β-hydroxysteroids; the latter compounds can then be subsequently oxidized to the corresponding 9α-fluoro-11-ketosteroids, if so desired. The 16α-hydroxyl derivatives are best prepared from the corresponding $\Delta^{16(17)}$-dehydro compounds by means of osmium tetroxide in accordance with the method described by R. Criegee in the Annalen, vol. 522, page 75 (1936), for the cishydroxylation of olefins, whereby 16α- and 17α-hydroxyl groups are introduced across the double bond of the steroid molecule. The 14α-hydroxyl derivatives are best prepared by microbiological means; for example, P. D. Meister, et al., have described at the 123rd National Meeting of the American Chemical Society at Los Angeles, California (1953), a procedure for the production of the 14α-hydroxyl derivative of compound S by means of a microorganism of the species Helicostylum piriforme. The 11-oxygenation of 17α-hydroxysteroids having a methylene group in the 11-position by means of a microorganism of the genus Stachylidium is described by G. M. Shull in U.S. patent application, Ser. No. 630,440, filed on December 26, 1956.

Thus, this invention provides an economical and efficient process for the production of new and useful halogenated Δ⁴-3-keto-11-oxysteroids of the pregnadiene and pregnatriene series in that the two-reaction steps of the herein described process are easily carried out in a convenient manner and that good yields are obtainable by the use of this process. The novel products so prepared are extremely valuable in view of their utility as therapeutic agents for the treatment of rheumatoid arthritis.

This invention is further illustrated by the following examples, which are not to be considered as imposing any limitation on the scope thereof.

*Example I*

To a chilled solution of 0.805 g. (0.002 mole) of Δ¹,⁴,⁶-pregnatriene-17α,21-diol-3,11,20-trione 21-acetate in 35 ml. of dioxane were added 2 ml. of chlorine dissolved in propionic acid (this amounted to about 0.1 g. of chlorine per ml. of solution, i.e., 1.5 equivalents of chlorine or 0.0025 mole). The reaction mixture was then allowed to stand at 0–5° C. for 18 hours. At the end of this time period, the clear reaction mixture was poured into 100 ml. of water and the resulting aqueous solution thoroughly extracted with two-100 ml. portions of diethyl ether. The ether extracts were then combined and subsequently washed with an equal volume of water, dried over anhydrous magnesium sulfate and filtered. Concentration of the ethereal filtrate afforded a crude product which was recrystallized from acetone-diethyl ether to afford a 14% yield of pure crystalline 1,2-dichloro-Δ⁴,⁶-pregnadiene-17α,21-diol-3,11,20-trione 21-acetate: M.P. 153–155° C.;

$\lambda_{max.}^{EtOH}$ at 300 mμ (ε =22,200)

In a similar manner, when bromine was used in place of chlorine in this procedure, Δ¹,⁴,⁶-pregnatriene-17α-21-diol-3,11,20-trione 21-acetate was converted to 1,2-dibromo-Δ⁴,⁶-pregnadiene-17α,21-diol-3,11,20-trione 21-acetate.

*Example II*

A mixture of 200 mg. of 1,2-dichloro-Δ⁴,⁶-pregnadiene-17α,21-diol-3,11,20-trione 21-acetate in 8 ml. of anhydrous pyridine was warmed on a hot plate until a clear solution was effected. The resulting solution was then allowed to stand at room temperature for two hours. At the end of this time period, it was extracted with 50 ml. of methylene chloride, and the latter extract was subsequently washed with two-50 ml. portions of 3 N HCl and then with four-50 ml. portions of water until neutral. The separated aqueous phases were then collected and treated with another 50 ml. of methylene chloride and the pooled methylene chloride extracts were subsequently dried over anhydrous sodium sulfate. After removal of the drying agent by means of filtration, the solvent filtrate containing the product was concentrated under reduced pressure and there were obtained 186 mg. of an almost colorless solid. Recrystallization of the latter material from acetone-diethyl ether afforded 110 mg. of pure crystalline 2-chloro-Δ¹,⁴,⁶-pregnatriene-17α,21-diol-3,11,20-trione 21-acetate: M.P. 223.5–226° C.;

$\lambda_{max.}^{EtOH}$ at 220, 266 and 307 mμ (ε =16,200, 11,500, and 10,000, respectively)

In a similar manner, 2-bromo-Δ¹,⁴,⁶-pregnatriene-17α,21-diol-3,11,20-trione 21-acetate was obtained when 1,2-dibromo-Δ⁴,⁶-pregnadiene-17α,21-diol-3,11,20-trione 21-acetate was subjected to the procedure described in this example.

*Example III*

When prednisone 21-acetate was subjected to the procedures described in Examples I and II, the intermediate product obtained was 1,2-dichloro-Δ⁴-pregnene-17α,21-diol-3,11,20-trione-21-acetate and the final product obtained was 2-chloroprednisone 21-acetate. In a similar manner, the 11-trifluoroacetyl derivative of prednisolone 21-acetate was converted via the 11-trifluoroacetyl derivative of 1,2-dichloro-Δ⁴-pregnene-11β,17α,21-triol-3,20-dione 21-acetate to 2-chloroprednisolone 21-acetate, Δ⁴,⁶-pregnadiene-17α,21-diol-3,11,20-trione 21-acetate was converted via 6,7-dichloro-Δ⁴-pregnene-17α,21-diol-3,11,20-trione 21-acetate to 6-chloro-Δ⁴,⁶-pregnadiene-17α,21-diol-3,11,20-trione 21-acetate, 9α-fluoroprednisone 21-acetate was converted via 1,2dichloro-9α-fluoro-Δ⁴-pregnene-17α,21-diol-3,11,20-trione 21-acetate to 2-chloro-9α-fluoroprednisone 21-acetate, the 11-trifluoroacetyl derivative of 9α-fluoroprednisolone 21-acetate was converted via the 11-trifluoroacetyl derivative of 1,2-dichloro-9α-fluoro-Δ⁴-pregnene-11β,17α,21-triol-3,20-dione 21-acetate to 2-chloro-9α-fluoroprednisolone 21-acetate, 9α-fluoro-Δ⁴,⁶-pregnadiene-17α,21-diol-3,11,20-trione 21-acetate was converted via 6,7-dichloro-9α-fluoro-Δ⁴-pregnene-17α-21-diol-3,11,20-trione 21-acetate to 6-chloro-9α-fluoro-Δ⁴,⁶-pregnadiene-17α,21-diol-3,11,20-trione 21-acetate, 9α-fluoro-Δ¹,⁴,⁶-pregnatriene-17α,21-diol-3,11,20-trione 21 acetate was converted via 1,2-dichloro-9α-fluoro-Δ⁴,⁶-pregnadiene-17α,21-diol-3,11,20-trione 21-acetate to 2-chloro-9α-fluoro-Δ¹,⁴,⁶-pregnatriene-17α,21-diol-3,11,20-trione 21-acetate.

In a similar manner, the bromo analogues of the above products can be obtained via the use of the corresponding dibromo compounds as intermediates. Thus, prednisone 21-acetate was converted via 1,2-dibromo-Δ⁴-pregnene-17α,21-diol-3,11,20-trione 21-acetate to 2-bromoprednisone 21-acetate, Δ⁴,⁶-pregnadiene-17α,21-diol-3,11,20-trione 21-acetate was converted via 6,7-dibromo-Δ⁴-pregnene-17α,21-diol,3,11,20-trione 21-acetate to 6-bromo-Δ⁴,⁶-pregnadiene-17α,21-diol-3,11,20-trione 21-acetate, and Δ¹,⁴,⁶-pregnatriene-17α,21-diol-3,11,20-trione 21-acetate was converted via 1,2-dibromo-Δ⁴,⁶-pregnadiene-17α,21- diol-3,11,20-trione 21-acetate to 2-bromo-$\Delta^{1,4,6}$-pregnatriene-17α,21-diol-3,11,20-trione 21-acetate.

*Example IV*

When $\Delta^{1,4}$-pregnadiene-17α,21-diol-3,20-dione 21-acetate was subjected to the procedures described in Examples I and II, the intermediate product obtained was 1,2-dichloro-$\Delta^4$-pregnene-17α,21-diol-3,20-dione 21-acetate and the final product obtained was 2-chloro-$\Delta^{1,4}$-pregnadiene-17α,21-diol-3,20-dione 21-acetate. In a similar manner, $\Delta^{4,6}$-pregnadiene-17α,21-diol-3,20-dione 21-acetate was converted via 6,7-dichloro-$\Delta^4$-pregnene-17α,21-diol-3,20-trione 21-acetate to 6-chloro-$\Delta^{4,6}$-pregnadiene-17α,21-diol-3,20-dione 21-acetate, and $\Delta^{1,4,6}$-pregnatriene-17α,21-diol-3,20-dione 21-acetate was converted via 1,2-dichloro-$\Delta^{4,6}$-pregnadiene-17α,21-diol-3,20-dione 21-acetate to 2-chloro-$\Delta^{1,4,6}$-pregnatriene-17α,21-diol-3,20,trione 21-acetate. The corresponding bromo compounds were obtained in a similar manner when bromine was employed in place of chlorine in the first step.

In addition, the 9α-fluoro derivatives of the above 11-desoxy compounds were prepared by the same procedure. Thus, when 9α-fluoro-$\Delta^{1,4}$-pregnadiene-17α,21-diol-3,20-dione 21-acetate was subjected to the procedures described in Examples I and II, the intermediate product obtained was 1,2-dichloro-9α-fluoro-$\Delta^4$-pregnene-17α,21-diol-3,20-dione 21-acetate and the final product obtained was 2-chloro-9α-fluoro-$\Delta^{1,4}$-pregnadiene-17α,21-diol-3,20-dione 21-acetate. In a similar manner, 9α-fluoro-$\Delta^{4,6}$-pregnadiene-17α,21-diol-3,20-dione 21-acetate was converted via 6,7-dichloro-9α-fluoro-$\Delta^4$-pregnene-17α, 21-diol-3,20-dione 21-acetate to 6-chloro-9α-fluoro-$\Delta^{4,6}$-pregnadiene-17α, 21-dione-3,20-dione 21-acetate, and 9α-fluoro-$\Delta^{1,4,6}$ pregnatriene-17α,21-diol-3,20-dione 21-acetate was converted to 1,2 - dichloro-9α-fluoro-$\Delta^{4,6}$-pregnadiene-17α,21-diol-3,20-dione 21-acetate to 2-chloro-9α-fluoro-$\Delta^{1,4,6}$-pregnatriene-17α,21-diol-3,20-dione 21-acetate. Again, the corresponding bromo compounds were obtained when bromine was employed in place of chlorine in the first step.

Furthermore, the 14α- and 16α-hydroxyl derivatives of all these compounds have also been prepared in accordance with the above described procedures, provided that the 16α-hydroxyl group was first protected, as aforesaid, by an acetyl group.

*Example V*

The procedures described in the foregoing examples were followed here except that the starting materials employed were 21-lower aliphatic hydrocarbon carboxylic acid esters of the aforesaid $\Delta^4$-3-ketosteroids other than than the 21-acetate. The esters specifically employed in this case were the 21-propionate, 21-butyrate, 21-valerate, 21-caproate, 21-benzoate, 21-phenylacetate and 21-thenoate.

In addition, these same reactions were also carried out when the corresponding 21-free alcohols of each of the above compounds were employed as starting materials in this process. In each case, the corresponding halogenated 21-free alcohols were obtained.

*Example VI*

The procedure described in Example I was followed here except for the fact that the reaction was carried out in other inert polar organic solvents, such as diethyl ether, di-n-propyl ether, di-n-butyl ether, acetonitrile, propionitrile, and tetrahydrofuran; the results obtained in each case were substantially the same as those obtained when the reaction was conducted in dioxane. Furthermore, the halogenation step was also carried out in the presence of other lower aliphatic hydrocarbon carboxylic acids, such as propionic acid, butyric acid and valeric acid, with substantially the same results being obtained.

*Example VII*

The procedures described in Examples I and II were followed here except for the fact that the dehydrohalogenation was carried out with other tertiary amines, such as triethylamine, N,N-dimethylaniline, N,N-diethylaniline, quinoline, collidine, lutidine and picoline. In each case, the results obtained were substantially the same as those previously reported.

What is claimed is:

1. A compound chosen from the group consisting of halogenated $\Delta^4$-3-ketosteroids having the formulae:

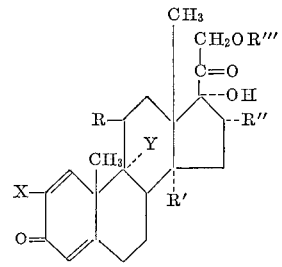

and the $\Delta^6$-dehydro derivatives thereof, wherein R represents a member selected from the group consisting of oxo and hydroxyl, X represents a member selected from the group consisting of chlorine and bromine, Y represents a member selected from the group consisting of hydrogen and fluorine, R' and R" represent a member selected from the group consisting of hydrogen and hydroxyl, and R'" represents a member selected from the group consisting of hydrogen and an acyl moiety having from two to eight carbon atoms.

2. A pharmaceutical composition comprising a compound as claimed in claim 1 together with a pharmaceutically acceptable carrier.

3. 2-chloroprednisone 21-acetate.

4. 2-chloro-9α-fluoroprednisone 21-acetate.

5. 2 - chloro-$\Delta^{1,4,6}$-pregnatriene-17α,21-diol-3,11,20-trione 21-acetate.

No references cited.

LEWIS GOTTS, *Primary Examiner.*

B. E. LANHAM, WALTER A. MODANCE, IRVING MARCUS, *Examiners.*

ELBERT L. ROBERTS, T. J. MORGAN,
*Assistant Examiners.*